US009969071B2

(12) United States Patent
Nitsche et al.

(10) Patent No.: US 9,969,071 B2
(45) Date of Patent: May 15, 2018

(54) PERCUSSION UNIT

(71) Applicant: Robert Bosch GmbH, Stuttgart (DE)

(72) Inventors: Rainer Nitsche, Kirchhaim/Teck (DE); Matthias Tauber, Bad Boll (DE); Gerd Schlesak, Tamm (DE); Antoine Vandamme, Gerlingen (DE); Thomas Winkler, Stuttgart (DE); Christian Bertsch, Markgroeningen (DE); Achim Duesselberg, Kirchheim/Teck (DE); Ulli Hoffmann, Niefern-Oeschelbronn (DE); Thilo Henke, Leinfelden-Echterdingen (DE); Juergen Lennartz, Ostfildern (DE); Helge Sprenger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 474 days.

(21) Appl. No.: 14/403,258

(22) PCT Filed: Apr. 24, 2013

(86) PCT No.: PCT/EP2013/058480
§ 371 (c)(1),
(2) Date: Nov. 24, 2014

(87) PCT Pub. No.: WO2013/174600
PCT Pub. Date: Nov. 28, 2013

(65) Prior Publication Data

US 2015/0136433 A1 May 21, 2015

(30) Foreign Application Priority Data

May 25, 2012 (DE) ........................ 10 2012 208 913

(51) Int. Cl.
*B23Q 5/00* (2006.01)
*B25D 16/00* (2006.01)
*B25D 11/00* (2006.01)

(52) U.S. Cl.
CPC ............ *B25D 16/006* (2013.01); *B25D 11/00* (2013.01); *B25D 11/005* (2013.01);
(Continued)

(58) Field of Classification Search
CPC .............................. B25D 16/006; B25D 11/00
(Continued)

(56) References Cited

U.S. PATENT DOCUMENTS 4,190,781 A 2/1980 Sauerwein et al.
4,232,752 A * 11/1980 Hauk ........................ E21B 1/02
173/133
(Continued)

FOREIGN PATENT DOCUMENTS

DE 100 14 314 A1 10/2001
DE 102 12 064 A1 10/2003
(Continued)

OTHER PUBLICATIONS

International Search Report corresponding to PCT Application No. PCT/EP2013/058480, dated Aug. 8, 2013 (German and English language document) (8 pages).

*Primary Examiner* — Robert Long
(74) *Attorney, Agent, or Firm* — Maginot, Moore & Beck LLP

(57) ABSTRACT

Percussion unit, especially for a rotary hammer and/or percussion hammer, comprising a control unit which is designed for open-loop and/or closed loop control of a pneumatic percussion mechanism, and at least one operating condition sensor unit. According to the disclosure, the control unit is designed to detect at least one percussion
(Continued)

mechanism parameter depending on measurement values of the operating condition sensor unit.

16 Claims, 7 Drawing Sheets

(52) U.S. Cl.
CPC .. *B25D 2211/003* (2013.01); *B25D 2211/068* (2013.01); *B25D 2250/035* (2013.01); *B25D 2250/131* (2013.01); *B25D 2250/145* (2013.01); *B25D 2250/201* (2013.01); *B25D 2250/221* (2013.01)

(58) Field of Classification Search
USPC .............. 173/1–11, 176–183, 39–56, 81–91, 173/112–115, 141, 144, 148, 213, 217, 173/170–171
See application file for complete search history.

(56) References Cited

U.S. PATENT DOCUMENTS 4,254,354 A * 3/1981 Keem .................. G01L 23/222 310/321
4,354,233 A * 10/1982 Zhukovsky ............ E21B 44/00 173/6
4,763,733 A 8/1988 Neumaier
5,154,242 A * 10/1992 Soshin .................. G05D 17/02 173/178
5,289,885 A * 3/1994 Sakoh ................ B25B 23/1405 173/109
5,392,865 A * 2/1995 Piras ..................... B25D 9/145 173/137
5,918,685 A * 7/1999 Ulbrich ................ B23B 49/006 173/15
6,044,918 A * 4/2000 Noser ................... B25D 16/00 173/176
6,076,616 A * 6/2000 Kramp ................ B25D 17/043 173/162.2
6,111,515 A * 8/2000 Schaer ..................... B25F 5/00 340/679
6,158,929 A * 12/2000 Fisher ................... G05B 19/19 408/1 R
6,520,266 B2 * 2/2003 Bongers-Ambrosius ............ B25D 11/12 173/115
6,598,684 B2 * 7/2003 Watanabe ............... B25B 21/02 173/176
6,687,567 B2 * 2/2004 Watanabe ........... B25B 23/1405 173/11
6,765,357 B2 * 7/2004 Cripe .................. B25B 23/1405 173/176
6,766,868 B2 * 7/2004 Frauhammer ........ B25D 16/006 173/162.2
6,836,614 B2 * 12/2004 Gilmore ................ B23P 19/066 173/176
6,892,826 B2 * 5/2005 Giardino ............. B25B 23/1405 173/1
6,978,846 B2 * 12/2005 Kawai ................... B23P 19/066 173/176
6,981,557 B2 * 1/2006 Boeni .................. B25D 11/005 173/1
6,983,807 B2 * 1/2006 Mayr ..................... B25D 16/00 173/48
6,988,734 B2 1/2006 Zierpka
7,004,366 B2 * 2/2006 Schiestl .................... B25C 1/08 123/46 SC
7,036,703 B2 * 5/2006 Grazioli .............. B25B 27/0085 173/176
7,055,620 B2 * 6/2006 Nadig .................. B25D 16/003 173/176
7,717,190 B2 * 5/2010 Keskiniva ................ B25D 9/26 173/1
8,674,640 B2 * 3/2014 Suda ...................... B25B 21/00 173/176
8,678,106 B2 * 3/2014 Matsunaga ........... B25B 21/008 173/176
9,180,585 B2 * 11/2015 Jung .................... B25D 16/006
9,470,081 B2 * 10/2016 Henriksson ............. E21B 44/00
2001/0025421 A1 * 10/2001 Damstra ................... B25F 5/00 30/43.6
2002/0003045 A1 * 1/2002 Bongers-Ambrosius ............ B25D 16/00 173/201
2002/0029115 A1 * 3/2002 Moriuchi ............... B23Q 11/00 702/34
2002/0050364 A1 * 5/2002 Suzuki .................... B25B 21/02 173/1
2002/0088626 A1 * 7/2002 Lindsay .................. B44B 3/005 173/30
2002/0129948 A1 * 9/2002 Wursch ................. B23B 49/006 173/4
2003/0182016 A1 * 9/2003 Fiebig ................ G05B 19/4083 700/168
2003/0205393 A1 11/2003 Hoop et al.
2004/0065455 A1 4/2004 Berger et al.
2004/0182587 A1 * 9/2004 May ........................ B25B 23/14 173/2
2004/0200628 A1 * 10/2004 Schmitzer ............ B25D 16/006 173/1
2005/0000998 A1 * 1/2005 Grazioli .............. B25B 27/0085 227/2
2005/0006143 A1 * 1/2005 Uitto ....................... E21B 44/00 175/27
2005/0007887 A1 * 1/2005 Sorrells ................... H03L 1/026 368/107
2005/0023017 A1 * 2/2005 Sakai ................... B25D 11/125 173/201
2005/0217875 A1 * 10/2005 Forster ...................... B25C 1/06 173/1
2005/0230130 A1 * 10/2005 Strasser .................... B25F 5/00 173/2
2006/0076154 A1 * 4/2006 Aoki .................... B25D 11/125 173/212
2007/0039749 A1 * 2/2007 Aoki ...................... B25D 16/00 173/201
2008/0289839 A1 * 11/2008 Hricko .................... B25B 21/00 173/1
2009/0032275 A1 * 2/2009 Ikuta ...................... B25D 17/24 173/117
2009/0065226 A1 3/2009 John et al.
2009/0195204 A1 * 8/2009 Gumpert ................ B25D 11/00 318/460
2009/0251330 A1 * 10/2009 Gerold ...................... B25C 1/08 340/12.22
2010/0175903 A1 * 7/2010 Ikuta .................... B25D 11/125 173/2
2011/0068141 A1 * 3/2011 Wolf ......................... B25C 1/08 227/9
2011/0101064 A1 * 5/2011 Wolf ......................... B25C 1/08 227/9
2013/0025892 A1 * 1/2013 Mashiko ................. B25B 21/02 173/2
2015/0101835 A1 * 4/2015 Nitsche ................ B25D 16/006 173/201
2015/0102084 A1 * 4/2015 Zhao ......................... B25C 1/08 227/10
2015/0129248 A1 * 5/2015 Nitsche ................ B25D 16/006 171/1
2015/0135907 A1 * 5/2015 Hirabayashi ........... B23Q 5/048 81/54

(56) References Cited

U.S. PATENT DOCUMENTS

| | | | | |
|---|---|---|---|---|
| 2015/0136433 | A1* | 5/2015 | Nitsche | B25D 16/006 173/2 |
| 2015/0196997 | A1* | 7/2015 | McClung | B25B 21/026 173/93 |
| 2015/0202758 | A1* | 7/2015 | Nitsche | B25D 16/006 173/1 |
| 2016/0279776 | A1* | 9/2016 | Wirnitzer | B25F 5/00 |

FOREIGN PATENT DOCUMENTS

| | | | |
|---|---|---|---|
| DE | 102 19 950 | C1 | 10/2003 |
| DE | 103 03 006 | A1 | 8/2004 |
| DE | 10 2008 000 908 | A1 | 10/2009 |
| DE | 10 2008 000 973 | A1 | 10/2009 |
| EP | 1 607 186 | A1 | 12/2005 |
| EP | 2 036 680 | A2 | 3/2009 |
| JP | 8-197456 | A | 8/1996 |
| JP | 2003-326475 | A | 11/2003 |
| JP | 2004-230548 | A | 8/2004 |
| WO | 02/072315 | A1 | 9/2002 |
| WO | 2007/141578 | A2 | 12/2007 |
| WO | 2010/087206 | A1 | 8/2010 |

* cited by examiner

PERCUSSION UNIT

This application is a 35 U.S.C. § 371 National Stage Application of PCT/EP2013/058480, filed on Apr. 24, 2013, which claims the benefit of priority to Serial No. DE 10 2012 208 913.6, filed on May 25, 2012 in Germany, the disclosures of which are incorporated herein by reference in their entirety.

BACKGROUND

There are already known percussion mechanism units, in particular for a rotary and/or percussion hammer, comprising a control unit that is provided to control a pneumatic percussion mechanism, and comprising at least one operating-condition sensor unit.

SUMMARY

The disclosure is based on a percussion mechanism unit, in particular for a rotary and/or percussion hammer, comprising a control unit that is provided to control a pneumatic percussion mechanism by open-loop and/or closed-loop control, and comprising at least one operating-condition sensor unit.

It is proposed that the control unit be provided to determine at least one percussion-mechanism parameter in dependence on measurement values of the operating-condition sensor unit. "Provided" is to be understood to mean, in particular, specially designed and/or specially equipped. A "percussion mechanism unit" in this context is to be understood to mean, in particular, a unit provided to operate a percussion mechanism. The percussion mechanism unit can have, in particular, a control unit. The percussion mechanism unit can have a motor and/or a transmission unit, provided to drive the percussion mechanism. A "control unit" in this context is to be understood to mean, in particular, a device of the percussion mechanism unit that is provided to control, in particular, the motor and/or the percussion mechanism by open-loop and/or closed-loop control. The control unit can preferably be realized as an electrical, in particular, an electronic, control unit. A "rotary and/or percussion hammer" in this context is to be understood to mean, in particular, a power tool provided for performing work on a workpiece by means of a rotary or non-rotary tool, wherein the power tool can apply percussive impulses to the tool. Preferably, the power tool is realized as a hand power tool that is manually guided by a user. A "percussion mechanism" in this context is to be understood to mean, in particular, a device having at least one component provided to generate a percussive impulse, in particular an axial percussive impulse, and/or to transmit such a percussive impulse to a tool disposed in a tool holder. Such a component can be, in particular, a striker, a striking pin, a guide element, such as, in particular, a hammer tube and/or a piston, such as, in particular, a pot piston and/or other component considered appropriate by persons skilled in the art. The striker can transmit the percussive impulse directly or, preferably, indirectly to the tool. Preferably, the striker can transmit the percussive impulse to a striking pin, which transmits the percussive impulse to the tool. An "operating-condition sensor unit" in this context is to be understood to mean, in particular, a measuring device provided to sense operating conditions of the percussion mechanism. The operating-condition sensor unit can comprise one or more sensors. A sensor can be disposed on a circuit board of the control unit. A sensor arrangement can be realized in a particularly inexpensive manner. A sensor can be disposed on a hand power-tool housing, on an inside or outside. The sensor can sense measurement values inside the hand power tool or outside the hand power tool in a particularly precise manner. A sensor can be disposed on a main handle or on an ancillary handle. A sensor can be disposed on a motor or on a guide tube. The sensor can sense, in particular, measurement values influenced by the motor and/or acting upon guide properties of the guide tube, in a particularly precise manner. The operating-condition sensor unit can advantageously comprise one or more external sensors. In particular, the operating-condition sensor unit can be connected to sensors of external devices, such as a smartphone, and/or to sensors and/or operating-condition data that are accessible via the Internet. Preferably, the operating-condition sensor unit can obtain data, relating to temperature and/or ambient air pressure, from external sensors. Savings can be made in respect of sensors. "Operating conditions" are to be understood to mean, in particular, physical quantities that influence the operation of the percussion mechanism. Operating conditions can be, in particular, environmental conditions of an environment of the percussion mechanism. "Influence" in this context is to be understood to mean, in particular, that an operating behavior of the percussion mechanism such as, in particular, an efficiency and/or a starting-up behavior, can alter as a result of the operating conditions. A "percussion-mechanism parameter" in this context is to be understood to mean, in particular, a value of an operating parameter that influences the operation of the percussion mechanism. In particular, the percussion-mechanism parameter can be a pressure and/or a percussion-mechanism rotational speed and/or a percussion frequency. In particular, the percussion-mechanism parameter can be a limit value of the operating parameter. The control unit can take account of the determined percussion-mechanism parameter during operation of the percussion mechanism. The percussion mechanism can be operated in a particularly reliable manner. The percussion mechanism can be operated in a highly effective manner in differing operating conditions.

It is proposed that the operating-condition sensor unit be provided to sense at least one temperature. In particular, the operating-condition sensor unit can be provided to sense a temperature of an environment of the percussion mechanism. In particular, the operating-condition sensor unit can be provided to sense a temperature of the percussion mechanism. A "temperature of the percussion mechanism" in this context is to be understood to mean, in particular, a temperature of a component of the percussion mechanism, in particular of the guide tube and/or of the striker and/or of a percussion-mechanism housing and/or transmission housing. The temperature can affect, in particular, a lubrication of the percussion mechanism, for example because of an altered viscosity of a lubricant. The temperature can cause expansion of components, and alter tolerances between components. The operating behavior of the percussion mechanism can alter. The control unit can set particularly suitable operating parameters for the temperature.

Further, it is proposed that the operating-condition sensor unit be provided to sense at least one ambient air pressure. The ambient air pressure can influence, in particular, a starting-up behavior of the percussion mechanism and/or a return movement against the percussion direction of the striker. In particular, a return movement of the striker can be unreliable in the case of low ambient air pressure. In particular, starting-up of the percussion mechanism can be unreliable in the case of low ambient air pressure. "Unreliable" in this context is to be understood to mean, in particular, that the percussive operating state fails repeatedly and/or randomly, in particular at least every 5 minutes, preferably at least every minute, and/or that a start-up of the percussion mechanism fails in the case of more than one in ten attempts to start the percussion mechanism, in particularly in the case of more than one in five attempts. The control unit can set suitable operating parameters for the ambient air pressure that ensure reliable operation.

Further, it is proposed that the control unit be provided to determine at least one limit frequency of an amplitude-frequency response of the percussion mechanism. An "amplitude-frequency response" of the percussion mechanism in this context is to be understood to mean, in particular, a percussive intensity of the striker in dependence on a percussion-mechanism frequency and/or a percussion-mechanism rotational speed. A "percussion-mechanism rotational speed" in this context is to be understood to mean, in particular, a rotational speed of an eccentric gear mechanism that moves a piston of the percussion mechanism. The piston can be provided, in particular, to generate a pressure cushion for applying pressure to the striker. The striker can be moved, in particular, at the percussion frequency, by the pressure cushion generated by the piston. There is preferably a direct relationship between the percussion frequency and the percussion-mechanism rotational speed. In particular, the absolute value of the percussion frequency 1/s can be the absolute value of the percussion-mechanism rotational speed revs/s. This is the case if the striker executes one strike per revolution of the eccentric gear mechanism. In the following, therefore, the terms "frequency" and "rotational speed" are used as equivalents. In the case of designs of a percussion mechanism that are different from this relationship, persons skilled in the art will adapt the following statements accordingly. A "limit frequency" in this context is to be understood to mean, in particular, a frequency in which a behavior of the amplitude-frequency response alters fundamentally. The limit frequency can represent a transition between a continuous and a discontinuous range of the amplitude-frequency response. In particular, the limit frequency can represent the beginning of a frequency range, in that the amplitude-frequency response has a hysteresis and/or in that a plurality of possible amplitudes are assigned to a frequency. Operation of the percussion mechanism can be unreliable and/or inadmissible at certain frequencies. The limit frequency can define a beginning or an end of such a range. It is possible to avoid operating the percussion mechanism with unreliable and/or inadmissible operating parameters. Reliability of the percussion mechanism can be increased. A performance capability of the percussion mechanism can be increased.

Further, it is proposed that the control unit be provided to define at least one operating parameter of the percussion mechanism. Preferably, the control unit is provided to define the operating parameter in dependence on a determined percussion-mechanism parameter. In particular, the control unit can be provided to define a starting value for the operating parameter. Further, the control unit can be provided to define a working value and/or a minimum and/or a maximum working value for the operating parameter. Further, the control unit can be provided to define an idling value for the operating parameter. A "working value" in this context is to be understood to mean a value of the operating parameter, set by the control unit, in the case of the percussive operating state of the percussion mechanism. An "idling value" in this context is to be understood to mean a value of the operating parameter, set by the control unit, in the case of the idling operating state of the percussion mechanism. A "starting value" in this context is to be understood to mean a value of the operating parameter, set by the control unit, in the case of a change of the percussion mechanism from the idling operating state to the percussive operating state. An "idling operating state" in this context is to be understood to mean, in particular, an operating state of the percussion mechanism that is characterized by absence of regular percussive impulses. Preferably, the percussion mechanism can have an idling mode, in which it is provided for an idling operating state. A "percussive operating state" in this context is to be understood to mean, in particular, an operating state of the percussion mechanism in which preferably regular percussive impulses are exerted by the percussion mechanism. Preferably, the percussion mechanism can have a percussion mode, in which it is provided to operate percussively. "Regular" in this context is to be understood to mean, in particular, recurring, in particular with a provided frequency. An "operating state" in this context is to be understood to mean, in particular, a mode and/or a setting of the control unit. The operating state can be dependent, in particular, on user settings, ambient conditions and other parameters of the percussion mechanism. A "change" from the idling operating state to the percussive operating state in this context is to be understood to mean a starting of the percussion mechanism from the idling operating state. The change to the percussive operating state can be effected, in particular, when the percussion mechanism is switched over from the idling mode to the percussion mode. Advantageously, the control unit can define the operating parameters. In particular, the control unit can define the operating parameters in dependence on the operating conditions, in particular on a temperature and/or an ambient air pressure. The percussion mechanism can be operated with advantageous operating parameters in differing operating conditions. In particular, in the case of a low ambient air pressure, operating parameters can be set with which a starting of the percussion mechanism is particularly reliable in the case of a low ambient air pressure. In the case of a high ambient air pressure, operating parameters can be set with which the percussion mechanism is particularly powerful. A robustness reserve of the operating parameters can be kept small. A "robustness reserve" in this context is to be understood to mean, in particular, a setting of an operating parameter that is provided to ensure reliable operation in the case of deviating operating conditions, which can result in a reduced performance capability under certain operating conditions. Preferably, the operating parameters are defined such that the percussion mechanism starts up reliably in the case of a percussion frequency of from 20-70 Hz, at least in the case of an ambient air pressure of from 950-1050 mbar and an ambient temperature of from 10-30° C., and/or a percussion frequency of from 20-70 Hz can be used as a starting value. In the case of known operating conditions, reliable operating parameters can be set for the operation of the percussion mechanism. There is no need for sensors for monitoring the operation of the percussion mechanism. Failure of the percussive operating state is rendered unlikely.

It is proposed that the operating parameter be a throttle characteristic quantity of a venting unit. A "throttle characteristic quantity" in this context is to be understood to mean, in particular, a setting of the venting unit that alters a flow resistance of the venting unit, in particular a flow cross section. A "venting unit" in this context is to be understood to mean, in particular, a ventilation and/or venting unit of the percussion mechanism. The venting unit can be provided, in particular, to balance the pressure and/or volume of at least one space in the percussion mechanism device. In particular, the venting unit can be provided for ventilating and/or venting a space, in front of and/or behind the striker in the percussion direction, in a guide tube that guides the striker. Preferably, the operating parameter can be a throttle position of the venting unit of the space disposed in front of the striker in the percussion direction. If the flow cross section is enlarged in the case of this venting unit, venting of the space in front of the striker can be improved. A counter-pressure, against the percussion direction of the striker, can be reduced. The percussion intensity can be increased. If the flow cross section is reduced in the case of this venting unit, venting of the space in front of the striker can be reduced. A counter-pressure, against the percussion direction of the striker, can be increased. The percussion intensity can be reduced. In particular, the return movement of the striker, against the percussion direction, can be assisted by the counter-pressure. Starting-up of the percussion mechanism device can be assisted. The operating parameter can ensure reliable starting-up of the percussion mechanism. The operating parameter with a reduced flow cross section can be a stable operating parameter. It can be suitable as a starting value. The operating parameter with an enlarged flow cross section can be a critical operating parameter in the case of increased performance capability of the percussion mechanism. It can be suitable as a working value.

In an advantageous design of the disclosure, it is proposed that the operating parameter be the percussion frequency and/or a percussion-mechanism rotational speed. The percussion-mechanism rotational speed can be set particularly easily by the control unit. A percussion-mechanism rotational speed can be particularly suitable for a case of performing work. The percussion mechanism can be particularly powerful in the case of a high percussion-mechanism rotational speed. In the case of a higher percussion-mechanism rotational speed, the motor of the percussion mechanism can be operated at a higher rotational speed. A ventilation unit driven by the motor can likewise be operated at a higher rotational speed. Cooling of the percussion mechanism and/or of the motor by the ventilation unit can be improved. A function of a percussion amplitude of the percussion mechanism can be dependent on the percussion-mechanism rotational speed. In the case of a rotational speed above a limit rotational speed, the function can have a hysteresis and be multi-valued. Starting of the percussive operating state in the case of switching over from the idling mode to the percussion-mechanism parameter, and/or restarting of the percussive operating state in the case of an interruption of the percussive operating state, can be unreliable and/or impossible. A percussion-mechanism rotational speed below the limit rotational speed can be used as a starting value and/or working value for a stable percussive operating state. A percussion-mechanism rotational speed above the limit rotational speed can be used as a working value for a critical percussive operating state. Above a maximum rotational speed, a percussive operating state can be impossible and/or unreliable. "Unreliable" in this context is to be understood to mean, in particular, that the percussive operating state fails repeatedly and/or randomly, in particular at least every 5 minutes, preferably at least every minute. The control unit can be provided to determine a setpoint percussion-mechanism rotational speed and/or setpoint frequency and/or a working value for the percussive operating state. The percussion mechanism can be particularly efficient with this operating parameter. The control unit can also be provided to determine a limit rotational speed, a starting rotational speed and/or a maximum rotational speed.

Further, it is proposed that the control unit be provided to determine the at least one operating parameter by means of a computing unit. A "computing unit" in this context is to be understood to mean, in particular, a unit for calculating at least one mathematical formula. A "formula" in this context is to be understood to mean, in particular, a computational rule provided to determine the operating parameter, in dependence on input quantities, by calculation. In particular, the formula can be provided to calculate a limit frequency in dependence on an ambient air pressure and/or a temperature. A suitable formula can be defined by persons skilled in the art on the basis of calculations and/or on the basis of experiments. A formula can represent an approximation of a real behavior of the percussion mechanism. Persons skilled in the art will define which deviations a suitable formula can have from the real behavior, for example determined in experiments. In particular, a formula can be suitable if a calculated value deviates from a value, determined in tests with the percussion mechanism, by less than 50%, preferably by less than 25%, particularly preferably by less than 10%. The control unit can calculate a limit parameter for an operating value above which a starting of the percussion mechanism is unreliable. The control unit, starting from the limit parameter, can then define, as a starting value for this operating value, an operating parameter that has been reduced by a safety margin. The control unit can determine the operating parameters particularly easily.

Further, it is proposed that the control unit be provided to determine the at least one operating parameter by means of a memory unit for storing a characteristic curve and/or a family of characteristics. A "characteristic curve" in this context is to be understood to mean a number of value pairs that link a value to a further value of the value pair. A "family of characteristics" in this context is to be understood to mean a number of characteristics that each link a plurality of define values to a further, variable value, the individual characteristic curves differing in the magnitudes of at least one of the defined values. The characteristic curves and/or the families of characteristics can be determined in experiments and/or by calculations. The control unit can determine an operating parameter by taking, from the characteristic curve and/or the family of characteristics, the values that match the measured operating conditions. The control unit can be provided, advantageously, to appropriately interpolate values between the values included in the characteristic curve and/or in the family of characteristics. Persons skilled in the art are familiar with a multiplicity of methods by which interpolation of values is possible. The control unit can determine the operating parameters with a particularly small amount of computational work. The values can be determined by experiments. There is no need to link the values by a functional equation.

Further, it is proposed that the control unit be provided to take account of positional information and/or an operating mode and/or an application case in determining the at least one percussion-mechanism parameter and/or the at least one operating parameter. "Positional information" in this context is to be understood to mean, in particular, a direction of a weight force in relation to the percussion mechanism. A position sensor can be provided to sense the positional information. Operating parameters of the percussion mechanism can be influenced by the position. A return movement of the striker can be hampered by a weight force acting in the percussion direction. The control unit can define operating parameters in dependence on the position. In particular, the starting value of the percussion frequency for the starting of the percussion mechanism can be increased if the working position is directed substantially downward. A starting value of the percussion frequency for the starting of the percussion mechanism can be lowered if the working position is directed substantially upward. A "working position" in this context is to be understood to mean, in particular, an alignment of the percussion mechanism in relation to gravity. "Upward" in this context is to be understood to mean, in particular, a direction opposite to gravity, "downward" being at least substantially in the direction of gravity. An "application case" in this context is to be understood to mean, in particular, a specific application in which particular operating parameters are advantageous. An application case may require operation that is particularly low in vibration, a particularly high percussive effect and/or a particular frequency or a particularly rapid and/or frequent starting of the percussion mechanism. The control unit can define operating parameters in dependence on the application case. An "operating mode" may be in particular, a chipping operating mode, a drilling operating mode with the percussion mechanism deactivated, or a percussive drilling operating mode with the percussion mechanism activated and a rotary drilling motion. The control unit can define operating parameters in dependence on the operating mode. At least one further sensor can be provided to sense a speed of the striker before and after the strike. A rebound figure and/or the percussive intensity can be determined from a speed difference. The control unit can be provided to set or regulate at least one operating parameter in dependence on the determined percussive intensity. A setpoint percussive intensity can be maintained in a particularly precise manner.

Further, it is proposed that the control unit be provided to take account of at least one wear parameter in determining the at least one percussion-mechanism parameter and/or the at least one operating parameter. A wear parameter can be, in particular, a measure of wear on carbon brushes of the motor and/or varying friction. The control unit can be provided to estimate the wear parameter on the basis of an operating-hours counter. The control unit can contain families of characteristics and/or functions of operating parameters in dependence on a wear state and/or on a number of operating hours. The control unit can have sensors that are provided to measure a wear parameter, in particular a measure of wear on carbon brushes. The control unit can define operating parameters in dependence on the wear parameters.

It is proposed that the control unit be provided, in at least one operating state, to reduce the percussion frequency and/or the percussion-mechanism rotational speed temporarily to a starting frequency and/or to a starting rotational speed, for the purpose of changing from the idling operating state to the percussive operating state. A "starting frequency and/or a starting rotational speed" in this context is to be understood to mean, in particular, a rotational speed, below the limit rotational speed, that is suitable for a reliable change from the idling operating state to the percussive operating state. The percussion rotational speed can be reduced, in particular, to the starting rotational speed if the percussion mechanism is switched over from the idling mode to the percussion mode. The percussion rotational speed can likewise be reduced to the starting rotational speed, in particular, if the percussive operating state cuts out in the percussion mode. Preferably, an idling rotational speed in the idling mode can be identical to a working rotational speed in the case of the percussive operating state. Preferably, there is no need for the reduction to a starting rotational speed if the working rotational speed is a stable operating parameter of the percussion mechanism.

Further, it is proposed that the control unit be provided, in at least one operating state, to set the operating parameter directly to the working value, for the purpose of changing from the idling operating state to the percussive operating state. The control unit can be provided, in particular, to set the operating parameter directly to the working value if a user specifies a working value that is a stable operating parameter under given conditions. With this working value, changing from the idling operating state to the percussive operating state can be effected in a reliable manner. Setting of a starting value can be avoided. Brief changing of the operating parameter for the purpose of starting the percussion mechanism, resulting in user irritation, can be avoided. There is no need for the control unit to intervene in the operating parameter.

Further, an operation change sensor is proposed, which is provided to signal a change of the operating mode. In particular, a change from the idling mode to the percussion mode can be signaled to the control unit by the operation change sensor. The operation change sensor can be provided to detect a contact pressure of the tool upon a workpiece. Advantageously, it can be identified when the user commences a working operation. Particularly advantageously, the operation change sensor can detect a switchover of the percussion mechanism, in particular opening and/or closing of idling openings, and of further openings, of the percussion mechanism that are provided for a change of operating mode. The operation change sensor can detect a displacement of a control sleeve provided for changing the operating mode of the percussion mechanism. The control unit can identify, advantageously, when a change of operating mode of the percussion mechanism occurs. Advantageously, the control unit can alter the operating parameter, in order to assist and/or enable the change of operating mode. The percussive operating state can be started in a reliable manner.

Further, it is proposed that the control unit have at least one delay parameter, which is provided to influence a time period for a change between two values of the operating parameter. The change from an idling value and/or working value to a starting value and/or from the starting value to the working value can be effected by a setpoint value step-change. Preferably, the change can be effected linearly and/or have a steady characteristic. An electric current consumption of the motor can be limited. Accelerations, driving forces and/or vibrations can be reduced. The delay parameter can be provided to define a slope of the function defining the change between the operating parameters. In particular, the time period for starting-up of the percussion mechanism can be defined. "Starting-up" in this context is to be understood to mean, in particular, a starting of the percussion mode from a standstill state of the motor. Starting-up of the percussion mechanism can be effected from standstill directly to a critical working value, in particular a critical working rotational speed. If the rotational speed increases slowly, the percussion mechanism can start before the limit rotational speed is attained. In the case of a slow increase in rotational speed, the control unit can allow a starting of the percussion mechanism with a critical working frequency, from standstill. There is no need for the starting value to be set. If the rotational speed increases rapidly, a starting of the percussion mechanism may fail before the limit rotational speed is attained. For a starting of the percussion mechanism, the rotational speed must be set temporarily to the starting rotational speed. Optimum operation of the percussion mechanism can be ensured.

Further, a hand power tool is proposed, comprising a percussion mechanism unit having the stated properties. The hand power tool can have the stated advantages.

Also proposed is a control unit for determining an operating parameter of a percussion mechanism unit having the said properties. The control unit can have the stated advantages.

Also proposed is a method for determining an operating parameter of a percussion mechanism unit. The method can have the stated advantages.

BRIEF DESCRIPTION OF THE DRAWINGS

Further advantages are given by the following description of the drawings. The drawings show three exemplary embodiments of the disclosure. The drawings, the description and the claims contain numerous features in combination. Persons skilled in the art will also expediently consider the features individually and combine them to create appropriate further combinations.

There are shown in the drawing.

DETAILED DESCRIPTION

Figure 1:
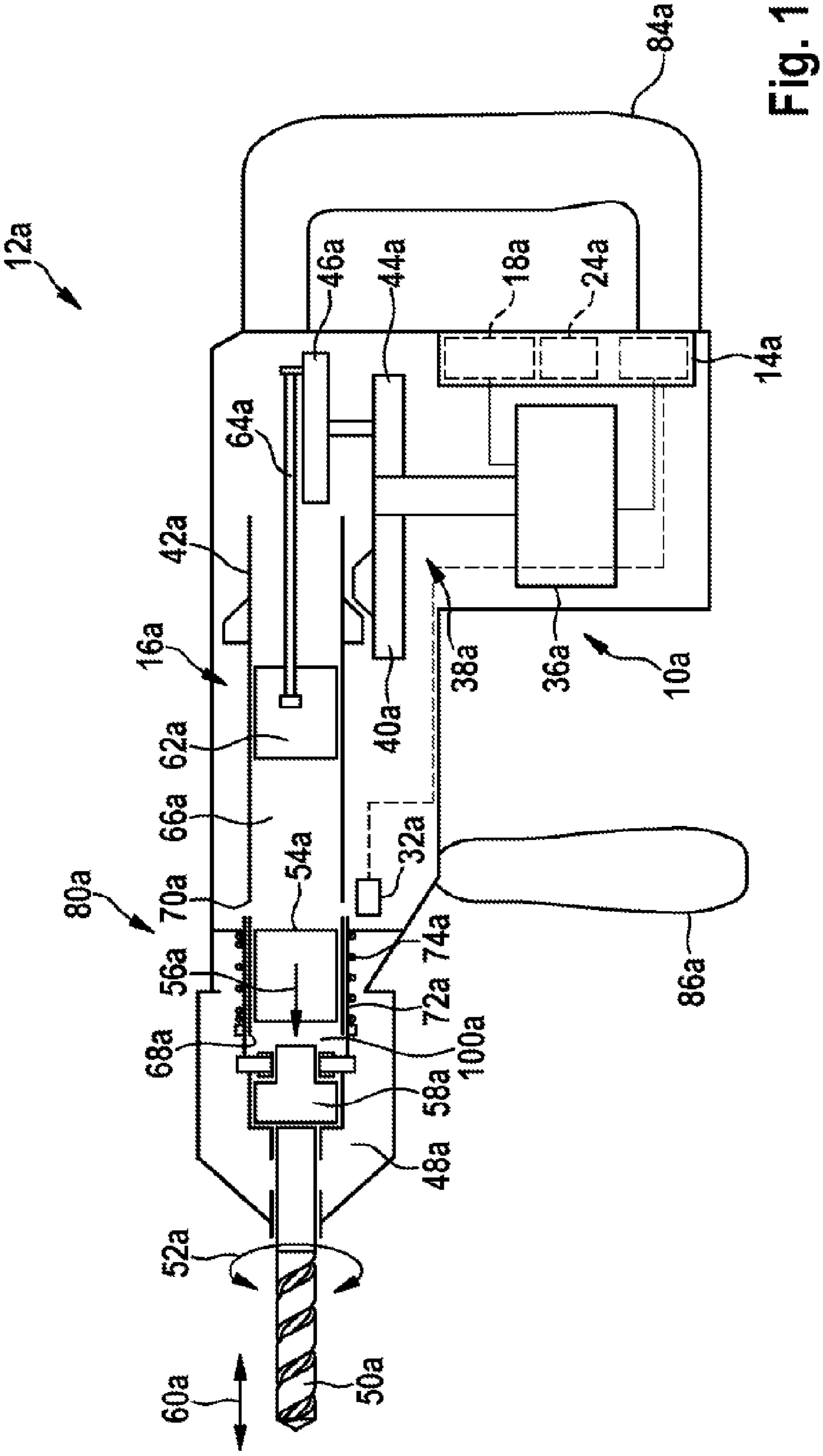
FIG. 1 shows a schematic representation of a rotary and percussion hammer having a percussion mechanism unit according to the disclosure, in a first exemplary embodiment, in an idling mode.
Figure 2:
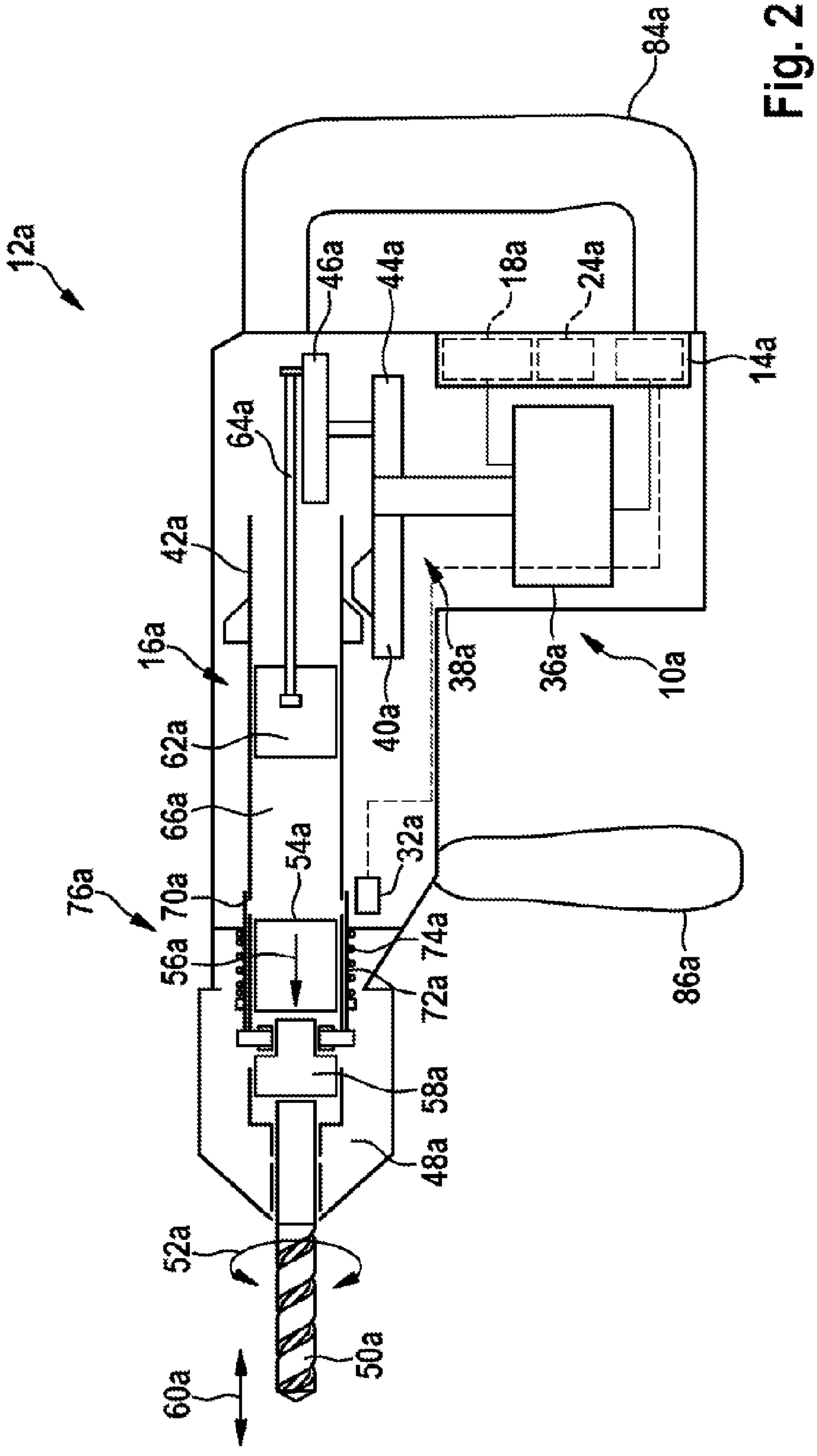
FIG. 2 shows a schematic representation of the rotary and percussion hammer in a percussion mode.

FIG. 1 and FIG. 2 show a rotary and percussion hammer 12*a*, having a percussion mechanism unit 10*a*, and having a control unit 14*a*, which is provided to control a pneumatic percussion mechanism 16*a* by open-loop and closed-loop control. The percussion mechanism unit 10*a* comprises a motor 36*a*, having a transmission unit 38*a* that drives a hammer tube 42*a* in rotation via a first gear wheel 40*a* and drives an eccentric gear mechanism 46*a* via a second gear wheel 44*a*. The hammer tube 42*a* is connected in a rotationally fixed manner to a tool holder 48*a*, in which a tool 50*a* can be clamped. For a drilling operation, the tool holder 48*a* and the tool 50*a* can be driven with a rotary working motion 52*a*, via the hammer tube 42*a*. If, in a percussive operating state, a striker 54*a* is accelerated in a percussion direction 56*a*, in the direction of the tool holder 48*a*, upon impacting upon a striking pin 58*a* that is disposed between the striker 54*a* and the tool 50*a* it exerts a percussive impulse that is transmitted from the striking pin 58*a* to the tool 50*a*. As a result of the percussive impulse, the tool 50*a* exerts a percussive working motion 60*a*. A piston 62*a* is likewise movably mounted in the hammer tube 42*a*, on the side of the striker 54*a* that faces away from the percussion direction 56*a*. Via a connecting rod 64*a*, the piston 62*a* can be moved periodically in the percussion direction 56*a* and back again in the hammer tube 42*a*, by the eccentric gear mechanism 46*a* driven with a percussion-mechanism rotational speed. The piston 62*a* compresses an air cushion 66*a* enclosed, between the piston 62*a* and the striker 54*a*, in the hammer tube 42*a*. Upon a movement of the piston 62*a* in the percussion direction 56*a*, the striker 54*a* is accelerated in the percussion direction 56*a*. The striker 54*a* can be moved back again, against the percussion direction 56*a*, by a rebound on the striking pin 58*a* and/or by a negative pressure that is produced between the piston 62*a* and the striker 54*a* as a result of a return movement of the piston 62*a*, against the percussion direction 56*a*, and/or by a counter-pressure in a percussion space 100*a* between the striker 54*a* and the striking pin 58*a*, and can then be accelerated for a subsequent percussive impulse back in the percussion direction 56*a*. Venting openings 68*a* are disposed in the hammer tube 42*a*, in a region between the striker 54*a* and the striking pin 58*a*, such that the air enclosed between the striker 54*a* and the striking pin 58*a* in the percussion space 100*a* can escape. Idling openings 70*a* are disposed in the hammer tube 42*a*, in a region between the striker 54*a* and the piston 62*a*. The tool holder 48*a* is mounted so as to be displaceable in the percussion direction 56*a*, and is supported on a control sleeve 72*a*. A spring element 74*a* exerts a force upon the control sleeve 72*a*, in the percussion direction 56*a*. In a percussion mode 76*a*, in which the tool 50*a* is pressed against a workpiece by a user, the tool holder 48*a* displaces the control sleeve 72*a* against the force of the spring element 74*a* such that it covers the idling openings 70*a*. If the tool 50*a* is taken off the workpiece, the tool holder 48*a* and the control sleeve 72*a*, in an idling mode 80*a*, are displaced by the spring element 74*a* in the percussion direction 56*a*, such that the control sleeve 72*a* releases the idling openings 70*a*. A pressure in the air cushion 66*a* between the piston 62*a* and the striker 54*a* can escape through the idling openings 70*a*. In the idling mode 80*a*, the striker 54*a* is not accelerated, or is accelerated only slightly, by the air cushion 66*a* (FIG. 1). In the idling operating state, the striker 54*a* does not exert any percussion impulses, or exerts only slight percussion impulses, upon the striking pin 58*a*. The rotary and percussion hammer 12*a* has a hand power-tool housing 82*a*, having a handle 84*a* and an ancillary handle 86*a*, by which it is guided by the user.

Starting of a percussive operating state upon switching over the percussion mechanism unit 10*a* from the idling mode 80*a* to the percussion mode 76*a* by closing the idling openings 70*a* is dependent on percussion-mechanism parameters, in particular on the percussion-mechanism rotational speed and an ambient air pressure. Owing to the air cushion 66*a* enclosed between the piston 62*a* and the striker 54*a*, the piston 62*a* is subjected to a periodic excitation, at a percussion frequency that corresponds to the percussion-mechanism rotational speed of the eccentric gear mechanism 46*a*.

Figure 3:
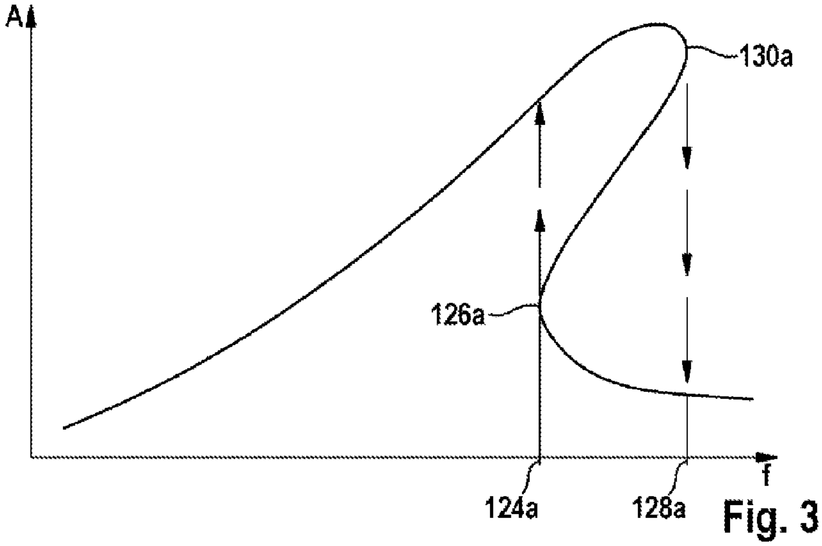
FIG. 3 shows a schematic representation of a simulated amplitude-frequency response of a non-linear oscillatory system.
Figure 4:
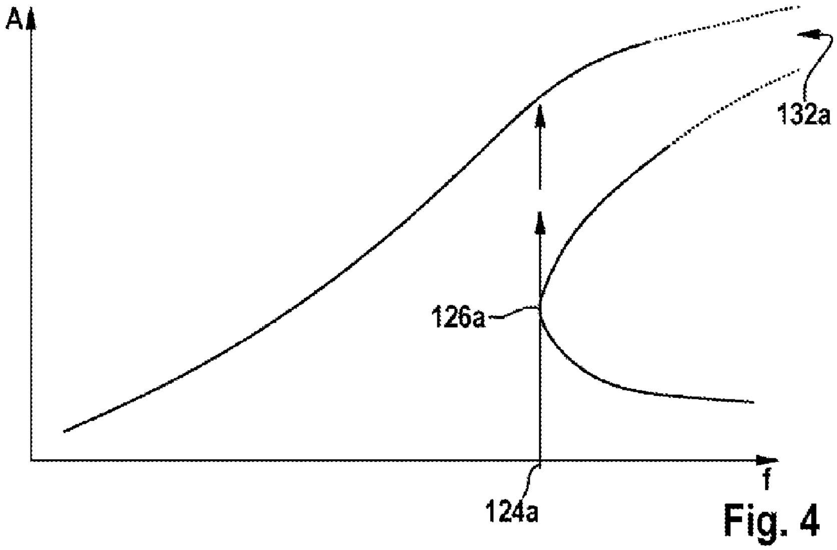
FIG. 4 shows a schematic representation of a further simulated amplitude-frequency response of the non-linear oscillatory system.

The percussion mechanism 16*a* constitutes a non-linear oscillatory system. To aid comprehension, FIG. 3 shows a schematic representation of a simulated amplitude-frequency response of a general, non-linear oscillatory system, in relation to a frequency f. The amplitude A in this case corresponds to the amplitude of an oscillating body of the system, corresponding to the striker 54*a* and not represented in greater detail here, in the case of an external excitation, as effected by the piston 62*a* in the case of the percussion mechanism 16*a*. The amplitude-frequency response is non-linear, the amplitude-frequency response having a plurality of solutions at high frequencies. Which amplitude ensues in this range depends, inter alia, on the direction in which the frequency f is varied. If, starting from a higher frequency f, the frequency goes below a minimum frequency 124*a* of the range of the amplitude-frequency response having a plurality of solutions, the amplitude A jumps from a vertex 126*a* with an infinite slope to an admissible solution of the amplitude-frequency response having a higher level. If a maximum frequency 128*a* of the range of the amplitude-frequency response having a plurality of solutions is exceeded from a lower frequency f, the amplitude A jumps from a vertex 130*a* with an infinite slope to an admissible solution of the amplitude-frequency response having a lower level. In FIG. 3, this behavior is indicated by arrows. FIG. 4 shows a further simulated amplitude-frequency response of the non-linear oscillatory system in the case of different conditions. Instead of having a maximum frequency 128*a*, the amplitude-frequency response has a gap 132*a*. This case occurs, for example, if the maximum frequency 128*a* is higher than a possible excitation frequency with which the oscillatory system can be excited. In the case of the percussion mechanism 16*a*, the excitation frequency can be limited, for example, by a maximum rotational speed of the eccentric gear mechanism 46*a*.

Figure 5:
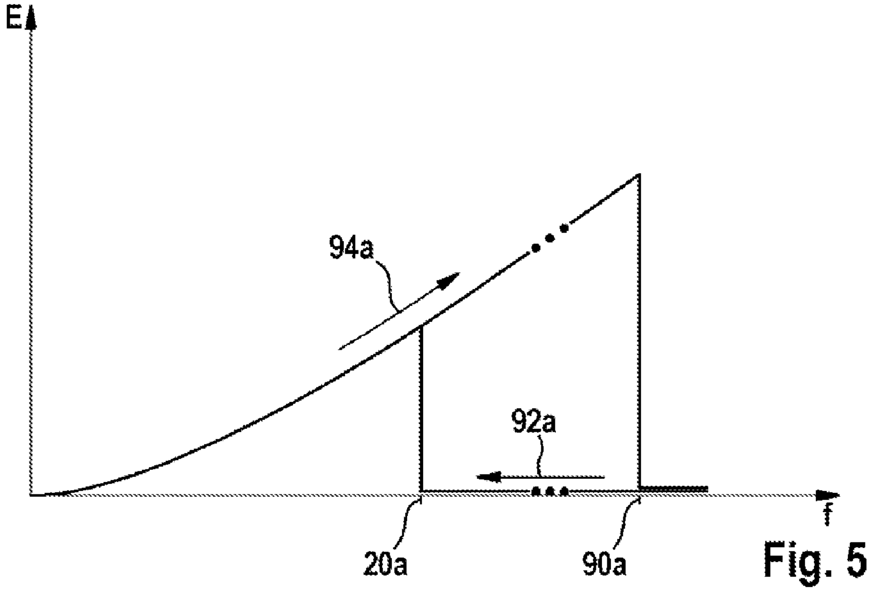
FIG. 5 shows a schematic representation of a simulated percussion energy of the percussion mechanism unit in the case of a starting of the percussion mechanism with a falling and with a rising percussion frequency.

FIG. 5 shows the effect of the non-linear amplitude-frequency response upon the percussive operating state of the percussion mechanism 16*a*. FIG. 5 shows a simulated percussion energy E of the percussion mechanism 16*a* in the case of a starting of the percussion mechanism with a falling percussion frequency 92*a*, and with a rising percussion frequency 94*a*. If the striker 54*a* is excited with a rising percussion-mechanism rotational speed, or percussion frequency 94*a*, the percussion energy E rises with the rise in the percussion frequency 94*a*. If the striker 66*a* is excited with a falling percussion-mechanism rotational speed, or percussion frequency 92*a*, starting from an idling operating state, from a high percussion-mechanism rotational speed, the percussive operating state commences only at a certain percussion-mechanism rotational speed. This percussion-mechanism rotational speed constitutes a limit frequency 20*a*. Above this percussion frequency, in the case of a falling percussion frequency 92*a* the striker 54*a* does not begin to move, or begins to move only with a low amplitude and/or speed, even if the idling openings 70*a* are closed in the case of a switchover from the idling mode 80*a* (FIG. 1) to the percussion mode 76*a* (FIG. 2). No percussive impulses, or only very slight percussive impulses, are exerted upon the striking pin 58*a* by the striker 54*a*. Above a maximum value 90*a*, the percussion energy E drops sharply. In this case, the striker 54*a* does not execute any movement in the percussion direction 56*a*, or executes movements of small amplitude in the percussion direction 56*a*, such that no percussive impulses, or only slight percussive impulses having a low percussion energy E, are delivered to the striking pin 58*a*. Depending on ambient conditions and the design of the percussion mechanism 16*a*, the limit frequency 20*a* lies in a range of from 20-70 Hz. The maximum value 90*a* is greater than the limit frequency 20*a* and, depending on ambient conditions and the design of the percussion mechanism 16*a*, lies in a range of from 40-400 Hz. Depending on ambient conditions and the design of the percussion mechanism 16*a*, the percussion energy E reaches 1-200 joules at the limit frequency 20*a*, and 2-400 joules at the maximum value 90*a*.

Figure 6:
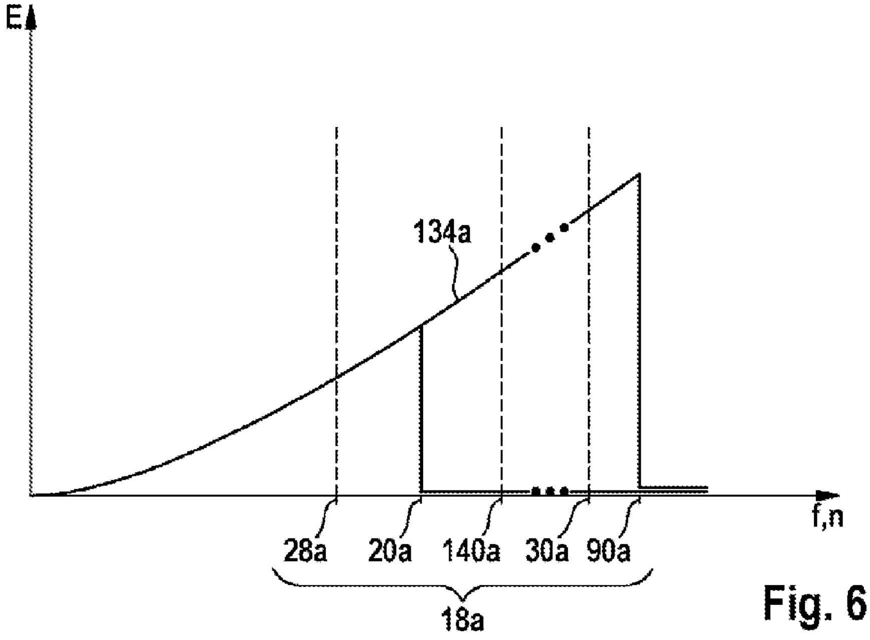
FIG. 6 shows a schematic representation of a possible definition of a starting value, a limit value, a working value and a maximum value.

FIG. 6 shows a schematic representation of a possible definition of operating parameters, in particular of a starting value 28*a*, the limit frequency 20*a*, a working value 30*a* and the maximum value 90*a*. The limit frequency 20*a* is preferably selected in the case of a percussion-mechanism rotational speed n at which the amplitude-frequency response has a single-valued solution and a reliable starting of the percussion mechanism is possible. The starting value 28*a* is less than or equal to the limit frequency 20*a*. A reliable starting of the percussion mechanism can be ensured, irrespective of the direction from which the starting value 28*a* is approached. The limit frequency 20*a* represents the transition to a multi-valued amplitude-frequency response and the maximum starting value 28*a*. The starting value 28*a* is preferably selected at an interval from the limit frequency 20*a*, for example with a 10% lower percussion-mechanism rotational speed. Once the percussive operating state has been assured, the percussion mechanism 16*a* can be operated with a higher output in the case of an above-critical working value 30*a*. A reliable starting of the percussion mechanism is not guaranteed in the case of the above-critical working value 30*a*. Above the maximum value 90*a*, the percussion energy E drops sharply. The working value 30*a* is therefore selected so as to be lower than the maximum value 90*a*. The working value 30*a* may be defined by the control unit 14*a* or may be set by the user, for example via a selector switch, not represented in greater detail here. The working values 30*a* are defined in dependence on, inter alia, a case of performing work and/or a type of material and/or a tool type. Working values 30*a* are assigned to various settable work operations. A working value 30*a* above the limit frequency 20*a* is an above-critical working value 30*a*; a working value 30*a* below the limit frequency 20*a* and/or below the starting value 28*a* is a stable working value 30*a*. Besides the starting value 28*a* and the limit frequency 20*a*, an idling value 140*a* may optionally be defined. The idling value 140*a* is set, in particular, in the idling mode 80*a*. Advantageously, the idling value 140*a* is set so as to be higher than the starting value 28*a*. A ventilation unit, driven by the motor 36*a* and not represented here, can be operated with a higher rotational speed than in the case of operation with the starting value 28*a*. The cooling of the percussion mechanism 16*a* in the idling mode 80*a* is improved. The user perceives an operating noise of the rotary and percussion hammer 12*a* to be louder than in the case of the starting value 28*a*. Further, advantageously, the idling value 140*a* is set so as to be lower than the working value 30*a*. Sound emissions and/or vibrations can be reduced in comparison with operation with the working value 30*a*. Upon changing from the idling mode 80*a* to the percussion mode 76*a*, the starting value 28*a* can be attained more rapidly than from the working value 30*a*.

Figure 7:
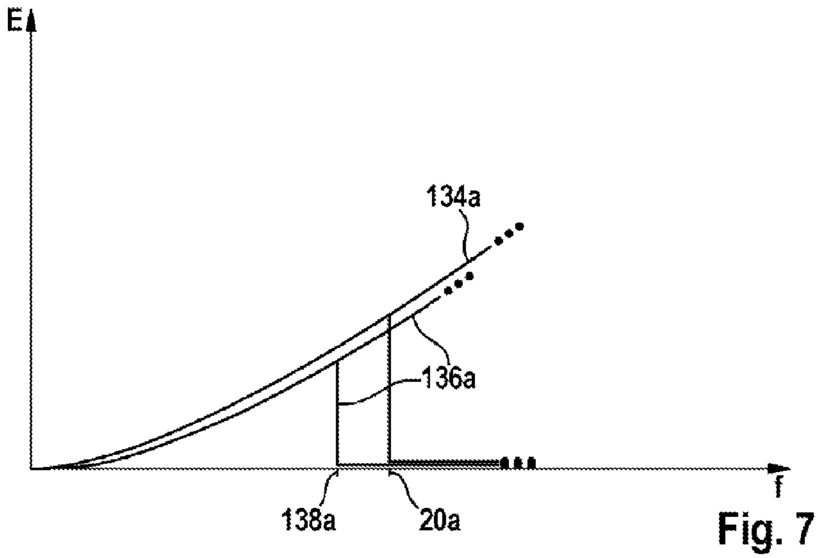
FIG. 7 shows a schematic representation of the simulated percussion of the percussion mechanism unit in the case of a starting of the percussion mechanism in differing ambient air pressure conditions.

FIG. 7 shows the simulated percussion energies E of the percussion mechanism 16*a* in the case of a starting of the percussion mechanism with a falling and a rising percussion frequency, in differing ambient conditions. In this example, the curve 134*a* shows the percussion energy E in the case of a first ambient air pressure, and the curve 136*a* shows the percussion energy E in the case of a second ambient air pressure that is lower than the first ambient air pressure. A limit frequency 138*a* in the case of the second ambient air pressure occurs at a lesser percussion frequency than the limit frequency 20*a* in the case of the first ambient air pressure. If the second ambient air pressure is 10% lower than the first ambient air pressure, the limit frequency 138*a* is 1-25% lower than in the case of the first ambient air pressure, depending on other influencing factors. A temperature of the percussion mechanism 16*a*, in particular of the hammer tube 42*a*, likewise influences the limit frequency 20*a*. At a lower ambient temperature, there is an increased friction of the striker 54*a* in the hammer tube 42*a*, in particular as a result of an increasing viscosity of lubricants. If the temperature of the hammer tube 42*a* falls by 10K, the limit frequency 20*a* is reduced by 1-30%, depending on other influencing factors. The limit frequency 20*a* may also vary by +/−20% because of influences caused by the tool. The tool may affect a rebound of the striker 54*a* from the striking pin 58*a*, and thus influence the limit frequency 20*a* of the percussion frequency.

The control unit 14*a* is provided to determine the percussion-mechanism parameters in dependence on measurement values of an operating-condition sensor unit 18*a*. In particular, the control unit 14*a* is provided to determine the limit frequency 20*a* of the amplitude-frequency response for a reliable starting of the percussion mechanism. The operating-condition sensor unit 18*a* is provided to sense a temperature and the ambient air pressure. The operating-condition sensor unit 18*a* is integrated as a module on a circuit board of the control unit 14*a*. The operating-condition sensor unit 18*a* senses an ambient temperature. The temperature affects a viscosity of lubricants and a friction of the striker 54*a* with the hammer tube 42*a*. The ambient air pressure affects, in particular, the return movement of the striker 54*a*, and the limit frequency 20*a* of the amplitude-frequency response for a reliable starting of the percussion mechanism. In addition, the operating-condition sensor unit 18*a* has a radio interface, not represented in greater detail here, by means of which it can obtain temperature and ambient air pressure data from an external device, likewise not represented in greater detail here, such as a smartphone and/or from the Internet. The control unit 14*a* is further provided to define operating parameters of the percussion mechanism 16*a*. The operating parameter is determined by means of a computing unit 24*a* for calculating a formula. A possible formula for definition of a pressure-dependent maximum value 90*a* of the setpoint percussion-mechanism rotational speed in dependence on the ambient air pressure is:

$$f_{setpoint,max}=f_0+C_{lin,p}*P$$

wherein $f_0$ represents a base frequency and/or base rotational speed, $C_{lin,p}$ represents an application-dependent constant of the pressure term, and P represents the ambient air pressure. In the present example, $f_0$ has the value of 10 Hz, and $C_{lin,p}$ has a value of 0.05 Hz/mbar. In the case of an ambient air pressure of 1000 mbar, $f_{setpoint,max}$ is 60 Hz. Persons skilled in the art will adapt these parameters as appropriate. In the case of different base rotational speeds and/or different pressure-dependent and application-dependent constants $C_{lin,p}$, pressure-dependent values can be defined accordingly for the starting value 28*a*, the working value 30*a* and the limit frequency 20*a*. If the working value 30*a* and/or the maximum value 90*a* of the setpoint percussion-mechanism rotational speed is defined below the limit frequency 20*a*, the starting value 28*a* can be omitted, and the percussion mechanism 16*a* can be started with the working value 30*a*.

In an operating mode, the control unit 14*a*, as well as taking account of the ambient air pressure, can take account of the temperature; in this case, the functional equation is expanded as follows:

$$f_{setpoint,max}=f_0+C_{lin,p}*P+C_{lin,T}*T$$

$C_{lin,T}$ represents an application-dependent constant of the temperature term. The other operating parameters are defined in a similar manner. In the present example, $f_0$ has the value of 5 Hz, and $C_{lin,p}$ has a value of 0.05 Hz/mbar, and $C_{lin,T}$ has a value of 0.25 Hz/° C., wherein the temperature in ° C. is to be inserted. In the case of an ambient air pressure of 1000 mbar and a temperature of 20° C., $f_{setpoint,max}$ is 60 Hz. Persons skilled in the art will adapt these parameters as appropriate. As well as the ambient air pressure and temperature, further terms can be introduced, such as a term dependent on an operating hours count, which takes account of an alteration of the percussion mechanism caused by wear. A position sensor of the operating-condition sensor unit 18*a*, not represented here, senses a position of the rotary and percussion hammer 12*a*; in the definition of the operating parameters, the positional information can be taken into account in a further term. The term for the working position is selected such that $f_{setpoint,max}$ is reduced in the case of an upwardly directed working position, and is increased in the case of a downwardly directed working position. Persons skilled in the art can define appropriate factors for this term by experiments.

In a further operating mode, the user can use a rotary wheel, not represented in greater detail here, to set a rotational speed factor ($X_{rotation}$) 88*a*, which is then multiplied by a pressure-dependent and/or temperature-dependent setpoint percussion number for the percussive operating state $f_{setpoint,max}$:

$$f_{setpoint}=X_{rotation}*f_{setpoint,max}$$

The rotational speed $f_{setpoint}$ is set by the control unit 14*a* in the percussive operating state. Thus, starting from the optimum working value 30*a* for the respective operating conditions, the user can lower the percussion-mechanism rotational speed as required.

Figure 8:
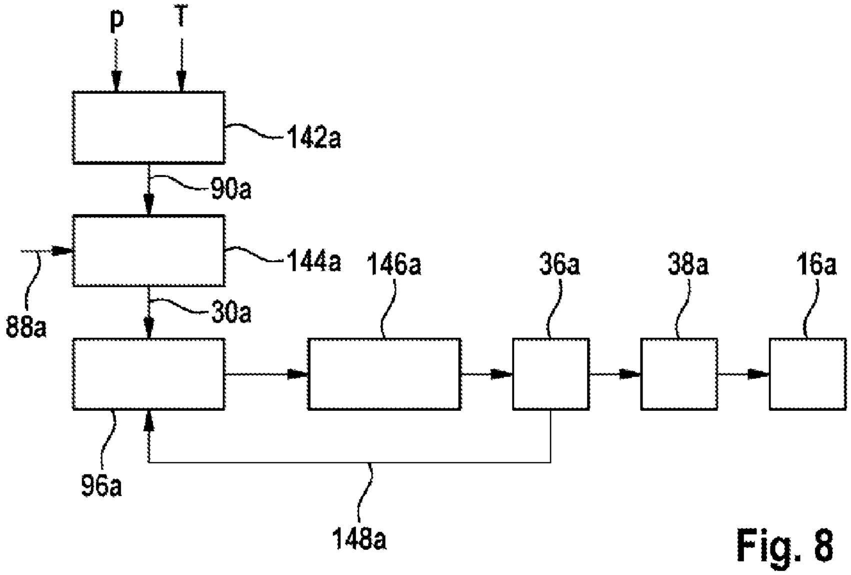
FIG. 8 shows a block diagram of an algorithm of the percussion mechanism unit.

FIG. 8 shows a block diagram of an algorithm of the percussion mechanism unit 10*a*. In a first step 142*a*, the maximum value 90*a* of the setpoint percussion number is set in dependence on the ambient air pressure P and temperature T. In a second step 144*a*, the rotational speed factor 88*a* is multiplied by the maximum value 90*a*, in order to determine the working value 30*a* of the setpoint percussion number. A feedback control unit 96*a* controls the motor 36*a* by means of a power electronics unit 146*a*. In the determination of rotational speed of the motor 36*a*, required for a setpoint percussion number, the percussion mechanism unit 10*a* takes account of a transmission ratio of the transmission unit 38*a*. A rotational-speed actual value 148*a*, for controlling the motor 36*a* by closed-loop control, is fed back by the motor 36*a* to the feedback control unit 96*a*.

If an above-critical working value 30*a* is selected as a setpoint percussion number, the control unit 14*a* is provided to set the setpoint percussion number temporarily to the starting value 28*a* for the purpose of changing from the idling operating state to the percussive operating state. After a defined timespan, in which a starting of the percussion mechanism has occurred in the case of operation of the percussion mechanism 16*a* with the starting value 28*a*, the setpoint percussion number is increased to the working value 30*a*. The timespan during which the percussion mechanism unit 10*a* sets the starting value 28*a* in the case of a starting of the percussion mechanism is defined by a delay parameter. The delay parameter is defined by persons skilled in the art or, advantageously, can be set by the user.

An operation change sensor 32*a* is provided to signal a change of the operating mode to the percussion mechanism unit 10*a*. The operation change sensor 32*a* is disposed such that it senses a control sleeve position, and signals when the control sleeve 72*a* is displaced from the idling mode 80*a* to the percussion mode 76*a*. The percussion mechanism unit 10*a* then sets the setpoint percussion number temporarily to the starting value 28*a* if an above-critical working value 30*a* has been selected.

The following description and the drawings of further exemplary embodiments are limited substantially to the differences between the exemplary embodiments and, in principle, reference may also be made to the drawings and/or the description of the other exemplary embodiments in respect of components having the same designation, in particular in respect of components having the same reference numerals. To differentiate the exemplary embodiments, the letters b and c have been appended to the references of the further exemplary embodiments, instead of the letter a of the first exemplary embodiment.

Figure 9:
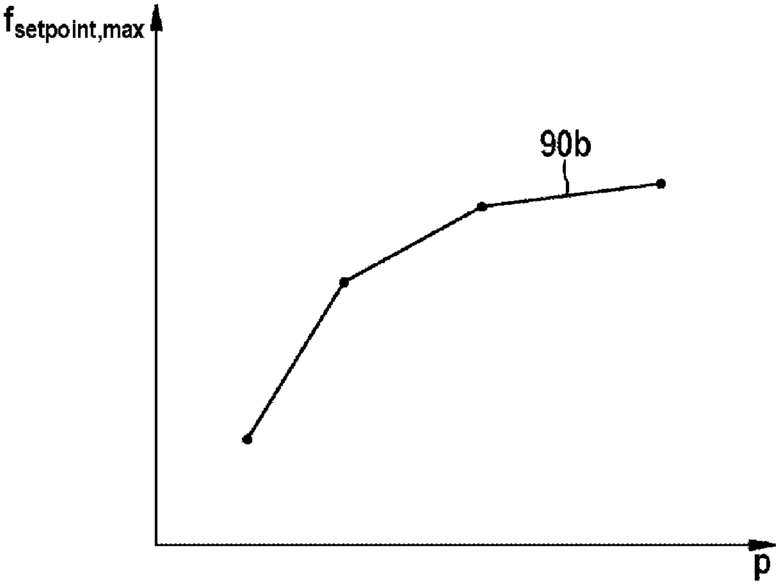
FIG. 9 shows a linear family of characteristics of a percussion mechanism having a percussion mechanism unit, in a second exemplary embodiment.
Figure 10:
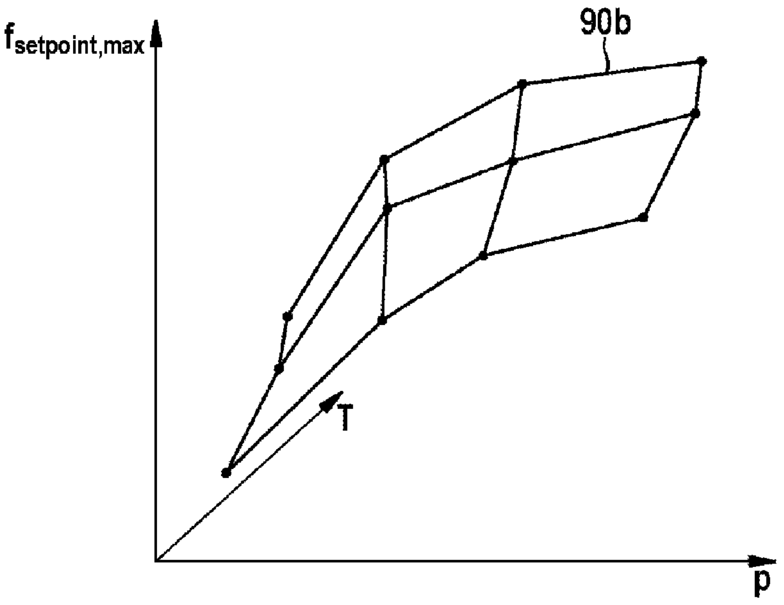
FIG. 10 shows a bilinear family of characteristics.

FIG. 9 and FIG. 10 show a characteristic curve and a family of characteristics of a percussion mechanism unit in a further exemplary embodiment. The percussion mechanism unit of the second exemplary embodiment differs from the previous one in that an operating parameter is determined by means of a memory unit for storing a characteristic curve and a family of characteristics. The characteristic curve (FIG. 9) and the family of characteristics (FIG. 10) serve, as described, to define a maximum value 90*b* of a setpoint percussion number $f_{setpoint,max}$. The characteristic curve defines the maximum value 90*b* in dependence on an ambient air pressure P; the family of characteristics serves to define the maximum value 90*b* in dependence on the ambient air pressure P and a temperature T. Intermediate values of the family of characteristics are interpolated as appropriate by the percussion mechanism unit.

Figure 11:
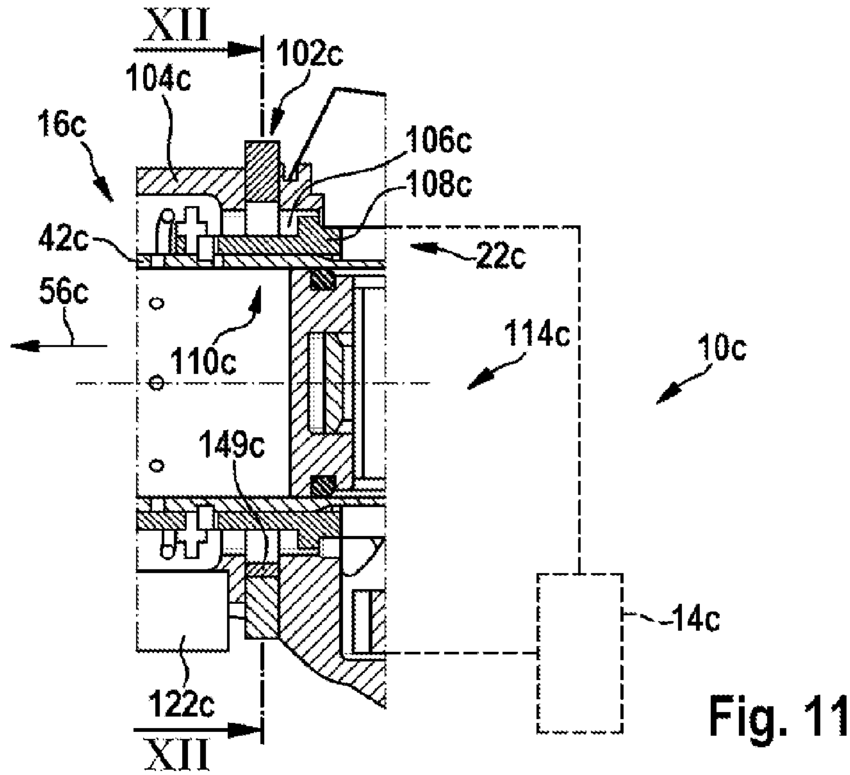
FIG. 11 shows a schematic representation of a venting unit of a percussion mechanism of a rotary and percussion hammer having a percussion mechanism unit, in a third exemplary embodiment.
Figure 12:
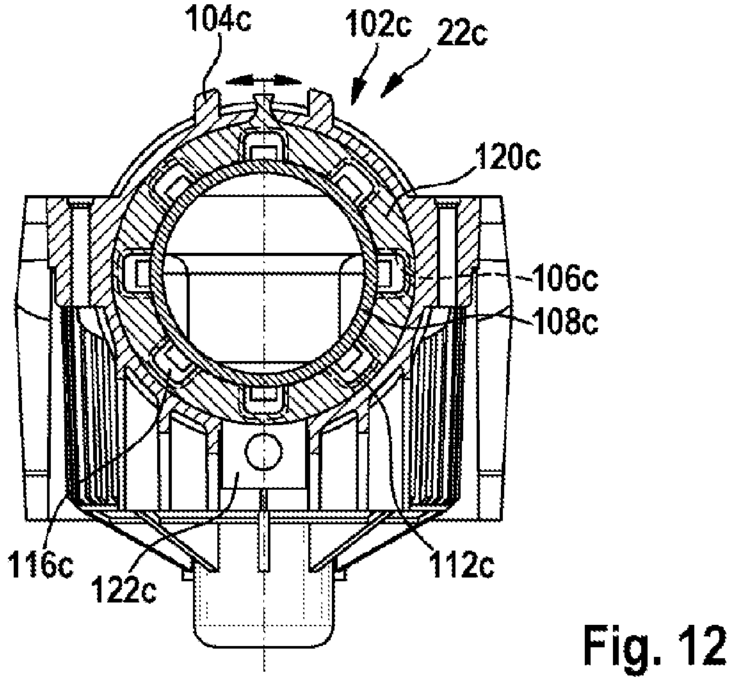
FIG. 12 shows a further schematic representation of the venting unit.

FIG. 11 and FIG. 12 show a percussion mechanism unit 10*c* in a further exemplary embodiment. The percussion mechanism unit 10*c* differs from the previous percussion mechanism unit in that an operating parameter defined by a control unit 14*c* is a throttle characteristic quantity of a venting unit 22*c*. A percussion space in a hammer tube 42*c* is delimited by a striking pin and a striker. The venting unit 22*c* has venting openings in the hammer tube 42*c*, for venting the percussion space. The venting unit 22*c* serves to equalize the pressure of the percussion space with that of an environment of a percussion mechanism 16*c*. The venting unit 22*c* has a setting unit 102*c*. The setting unit 102*c* is provided to influence a venting of the percussion space disposed in front of the striker in a percussion direction 56*c*, during a percussion operation. The hammer tube 42*c* of the percussion mechanism 16*c* is disposed in a transmission housing 104*c* of a rotary and percussion hammer 12*c*. The transmission housing 104*c* has ribs 106*c*, disposed in a star configuration, that face toward an outside of the hammer tube 42*c*. Pressed in between the hammer tube 42*c* and the transmission housing 104*c*, in an end region 110*c* that faces toward an eccentric gear mechanism, there is a bearing bush 108*c*, which supports the hammer tube 42*c* on the transmission housing 104*c*. The bearing bush 108*c*, together with the ribs 106*c* of the transmission housing 104*c*, forms air channels 112*c*, which are connected to the venting openings in the hammer tube 42*c*. The air channels 112*c* constitute a part of the venting unit 22*c*. The percussion space is connected, via the air channels 112*c*, to a transmission space 114*c* disposed behind the hammer tube 42*c*, against the percussion direction 56*c*. The air channels 112*c* constitute throttle points 116*c*, which influence a flow cross section of the connection of the percussion space to the transmission space 114*c*. The setting unit 102*c* is provided to set the flow cross section of the throttle points 116*c*. The air channels 112*c* constituting the throttle points 116*c* constitute a transition between the percussion space and the transmission space 114*c*. A setting ring 149*c* has inwardly directed valve extensions 120*c* disposed in a star configuration. Depending on a rotary position of the setting ring 149*c*, the valve extensions 120*c* can fully or partially overlap the air channels 112*c*. The flow cross section can be set by adjustment of the setting ring 149*c*. The control unit 14*c* adjusts the setting ring 149*c* of the setting unit 102*c* by rotating the setting ring 149*c* by means of a servo drive 122*c*. If the venting unit 22*c* is partially closed, the pressure in the percussion space that is produced upon a movement of the striker in the percussion direction 56*c* can escape only slowly. A counter-pressure forms, directed against the movement of the striker in the percussion direction 56*c*. This counter-pressure assists a return movement of the striker, against the percussion direction 56*c*, and thereby assists a starting of the percussion mechanism. If the value selected for the percussion-mechanism rotational speed is an above-critical working value at which reliable starting of the percussion mechanism is not possible with the venting unit 22*c* open, the control unit 14*c* partially closes the venting unit 22*c*, for the purpose of changing from an idling operating state to a percussive operating state. Starting of the percussive operating state is assisted by the counter-pressure in the percussion space. After the percussion mechanism has been started, the control unit 14*c* opens the venting unit 22*c* again. The control unit 14*c* can also use the operating parameter of the throttle characteristic quantity of the venting unit 22*c* for the purpose of regulating output.

The invention claimed is:

1. A percussion mechanism unit for at least one of a rotary hammer and a percussion hammer comprising:

a pneumatic percussion mechanism configured to generate percussive impulses; and a control unit having at least one operating-condition sensor configured to sense at least one of a temperature and an ambient air pressure, the control unit being configured to:

determine a maximum frequency of the pneumatic percussion mechanism based on the at least one of the temperature and the ambient air pressure, the maximum frequency being a frequency at which a kinetic energy of the percussive impulses stops increasing with increased frequency of the percussive impulses;

determine at least one operating parameter of the pneumatic percussion mechanism based on the determined maximum frequency; and operate the pneumatic percussion mechanism with the at least one operating parameter.

2. The percussion mechanism unit as claimed in claim 1, wherein:

the operating-condition sensor unit is configured to sense the temperature and the ambient air pressure; and the control unit is configured to determine the maximum frequency of the pneumatic percussion mechanism based on the temperature and the ambient air pressure.

3. The percussion mechanism unit as claimed in claim 1, wherein the control unit is configured to determine a limit frequency of the pneumatic percussion mechanism, the limit frequency being a frequency below which a starting of the pneumatic percussion mechanism to generate the percussive impulses is ensured.

4. The percussion mechanism unit as claimed in claim 1, wherein the at least one operating parameter is a throttle characteristic quantity of a venting unit.

5. The percussion mechanism unit at claimed in claim 1, wherein the at least one operating parameter is at least one of a percussion frequency and a percussion-mechanism rotational speed.

6. The percussion mechanism unit as claimed in claim 1, wherein the control unit is configured to determine the at least one operating parameter using a computing unit.

7. The percussion mechanism unit as claimed in claim 1, wherein the control unit is configured to determine the maximum frequency with reference to at least one of a characteristic curve and a family of characteristics stored in a memory unit.

8. The percussion mechanism unit as claimed in claim 1, wherein the control unit is configured to take account of at least one of positional information, an operating mode, and an application case in determining at least one of the maximum frequency and the at least one operating parameter.

9. The percussion mechanism unit as claimed in claim 1, wherein the control unit is configured to take account of at least one wear parameter in determining at least one of the maximum frequency and the at least one operating parameter.

10. The percussion mechanism unit as claimed in claim 1, wherein the control unit is configured, in at least one operating state, to set the at least one operating parameter temporarily to a starting value to change from an idling operating state to a percussive operating state.

11. The percussion mechanism unit as claimed in claim 1, wherein the control unit is configured, in at least one operating state, to set the at least one operating parameter to an above-critical working value in a percussive operating state.

12. The percussion mechanism unit as claimed in claim 1, wherein the control unit is configured, in at least one operating state, to set the at least one operating parameter directly to a working value, to change from an idling operating state to an percussive operating state.

13. The percussion mechanism unit as claimed in claim 1, further comprising:

an operation change sensor configured to signal a change of the operating mode.

14. The percussion mechanism unit as claimed in claim 1, wherein the control unit has at least one delay parameter, which is configured to influence a time period for a change between two values of the at least one operating parameter.

15. The percussion mechanism unit as claimed in claim 1, wherein a hand power tool comprises the percussion mechanism unit.

16. A method for operating a percussion mechanism unit for at least one of a rotary hammer and a percussion hammer, the percussion mechanism unit having (i) a pneumatic percussion mechanism configured to generate percussive impulses and (ii) a control unit having at least one operating-condition sensor configured to sense at least one of a temperature and an ambient air pressure, the method comprising:

sensing, with the at least one operating-condition sensor, the at least one of the temperature and the ambient air pressure;

determining, with the control unit, a maximum frequency of the pneumatic percussion mechanism based on the at least one of the temperature and the ambient air pressure, the maximum frequency being a frequency at which a kinetic energy of the percussive impulses stops increasing with increased frequency of the percussive impulses; and determining, with the control unit, at least one operating parameter of the pneumatic percussion mechanism based on the determined maximum frequency; and operating, with the control unit, the pneumatic percussion mechanism with the at least one operating parameter.

* * * * *